United States Patent [19]

Puyplat

[11] 4,201,452
[45] May 6, 1980

[54] REFLECTOR FOR AUTOMOBILE HEADLIGHTS

[75] Inventor: Olivier Puyplat, Paris, France

[73] Assignee: Societe Industrielle de Mecanique, Lyons, France

[21] Appl. No.: 19,373

[22] Filed: Mar. 12, 1979

Related U.S. Application Data

[62] Division of Ser. No. 833,123, Sep. 14, 1977, Pat. No. 4,147,565.

[30] Foreign Application Priority Data

Sep. 30, 1976 [FR] France .................................. 76 29355

[51] Int. Cl.$^2$ .............................................. G02B 5/08
[52] U.S. Cl. ...................................... 350/288; 350/320
[58] Field of Search ............... 350/288, 320; 362/296, 362/341; 427/27, 33, 162, 163; 148/6.15 R

[56] References Cited

FOREIGN PATENT DOCUMENTS

| | | | |
|---|---|---|---|
| 110966 | 7/1940 | Australia .................................. | 350/288 |
| 2304690 | 10/1976 | France .................................... | 427/162 |

*Primary Examiner*—F. L. Evans
*Attorney, Agent, or Firm*—Cullen, Sloman, Cantor, Grauer, Scott & Rutherford

[57] ABSTRACT

The present invention relates to a process for the application of a reflecting coating on a metallic surface such as sheet metal, whereby there is applied to the unpolished metallic surface, a layer of a pulverulent dressing; said layer is subjected to a heat treatment with a view to fixing it on the metallic surface and creating a surface having undulations coexisting with micro-fissures; the layer thus fixed is smoothed by the deposit of a layer of varnish intended to fill in the micro-fissures while conserving said undulations, and the surface thus obtained is then subjected to a conventional metallization operation. The invention finds particular application to the production of reflectors having a high power of reflection.

11 Claims, 1 Drawing Figure

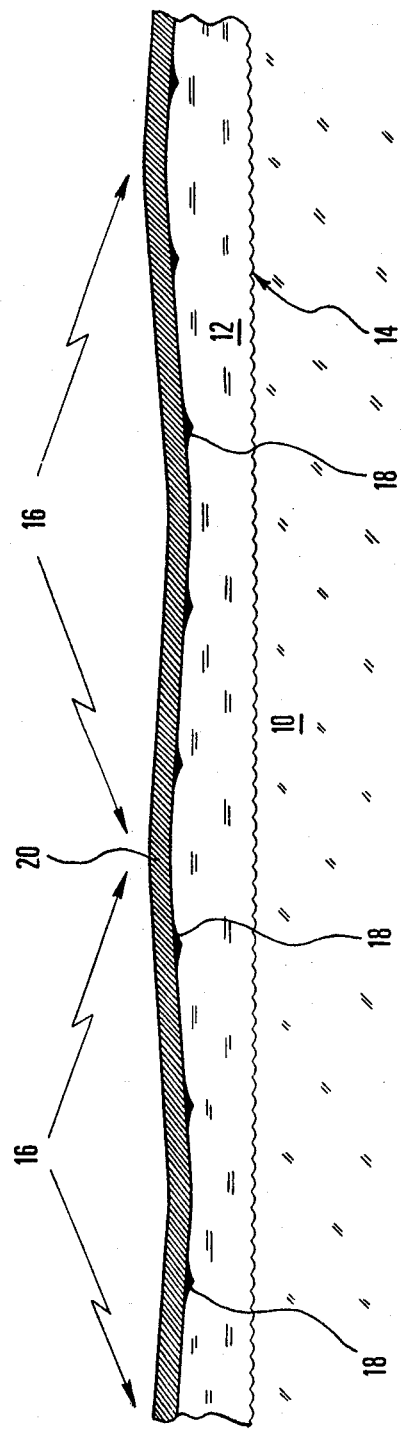

REFLECTOR FOR AUTOMOBILE HEADLIGHTS

This is a division of application Ser. No. 833,123, filed Sept. 14, 1977, now U.S. Pat. No. 4,147,565.

The present invention relates to a process for the application of a reflecting coating on a metallic surface such as sheet metal and to a surface obtained by carrying out said process.

After a metal sheet has been shaped by stamping, the surface state thereof is generally adversely affected and its granulation is therefore always rough. If this surface state is not improved, a reflecting surface is obtained, after aluminizing, whose optical efficiency is mediocre in view of a considerable fraction of the light at each micro-fissure, small crack or like defect.

In the prior art, the stamping operation was therefore always followed by a polishing intended to improve the state of the metallic surface. Such a polishing is always carried out in the presence of a fatty substance such as tallow, hence the necessity of resorting to a supplementary operation for degreasing the surface. Furthermore, the surface must also be carefully cleaned, particularly for removing the emery. Such a polishing operation is generally relatively expensive and is particularly difficult to carry out in the case of reflectors of automobile vehicle headlights. In fact, for reflectors whose frontal aperture is not circular, which is always the case in modern design headlights, a polishing mechanism is required which is provided with very complicated kinematics, this rendering the polishing operation very difficult and much more expensive.

As a perfect smoothness of the polished surface can validly be obtained only after the deposit of a layer of a certain thickness, it was necessary, in the prior art, to deposit two successive layers of varnish, each followed by a baking operation. The surface was then conventionally subjected to metallization, for example aluminizing.

The process according to the invention enables certain of the above-mentioned operations to be eliminated, such as the polishing of the sheet metal and the deposit of two successive layers of varnish, this therefore considerably reducing the cost of the coating operation, whilst providing a surface having a very high reflection factor.

The present invention therefore relates to a process for the application of a reflecting coating on a metallic surface such as sheet metal, which is characterised by the following successive operations:

A layer of pulverulent dressing is applied to the unpolished metallic surface, intended to reduce the roughness of said surface;

said layer of pulverulent dressing is subjected to a heat treatment with a view to fixing said layer on the metallic surface and to create a surface having large-amplitude and small-depth undulations coexisting with micro-fissures and other small defects;

the layer thus fixed is smoothed by the deposit of a layer of varnish intended to fill in the micro-fissures and like defects, whilst conserving said undulations, and the surface thus obtained is then subjected to a conventional metallization operation.

The invention will be more readily understood on reading the following description with reference to the accompanying drawings, in which:

The single FIGURE schematically shows a section through sheet metal provided with a reflecting coating in accordance with the present invention.

The unpolished sheet metal has a poor surface state which was adversely affected by the stamping operation for shaping said sheet. Such metal sheets generally have a rough granulation (dimensions of 1 to $2\mu$ and depth about $1\mu$), giving rise to micro-fissures which considerably diffract the light and consequently reduce the factor of reflection.

According to the process of the invention, there is applied to the unpolished metallic surface, for example on the stamped metal sheet 10, a layer of pulverulent dressing 12 intended to reduce the roughness of the surface 14 of the metal sheet 10. Said pulverulent dressing 12 may for example be chosen from resins of epoxy, polyurethane, polyester, polyvinyl, acrylic, etc. type. However, an epoxy type resin will preferably be used, since it allows an excellent fixing on the metal sheet 10 and gives this latter excellent anti-corrosive properties. The pulverulent dressing 12 advantageously has a granulometry of between about $2\mu$ and $60\mu$. It will be noted that the pulverulent dressing used, having given excellent results, has a granulometric section in the general form of a Gaussian curve.

This first application on the unpolished metallic surface 10 of a layer 12 of pulverulent dressing may be effected in very different manners, but it is preferable to employ techniques such as electrostatic spraying, or the application by means of a fluidised electrostatic bath. It should be noted here that, if an electrostatic spray gun is used, it is important to use a dry vector gas, for example dry air.

Once said layer 12 of pulverulent dressing is applied to the metallic surface 10, said layer is subjected to a heat treatment with a view to being fixed on said metallic surface. In fact, this fixing operation is effected by polymerisation, during which appears a phenomenon of compensation of losses of matter provoking a differential shrinkage which leads to the formation of long undulations 16 of large amplitude and shallow depth coexisting with pits and other small defects 18.

Said undulations 16 appearing on the surface are in fact constituted by a plurality of troughs and crests having an average diameter of from 1 to 2 mm, the depth of these undulations being of the order of 0.05 to 0.10 mm. Furthermore, said micro-fissures and other small defects 18 appearing on the surface after the heat treatment may be assimilated to pits or small cracks having a diameter of the order of 0.02 mm to 0.20 mm. It is precisely these micro-fissures 18 which cause a considerable diffusion of the light and give the reflecting surface a very poor factor of reflection.

According to the process of the invention, the layer 12 of pulverulent dressing thus fixed is smoothed by the deposit of a layer of varnish 20 intended to fill in said micro-fissures and other small defects 18, whilst conserving said undulations. It will be noted that, to obtain a reflecting surface having a high power of reflection it is important that, after its heat treatment, the layer of pulverulent dressing have a thickness of between 30 and $80\mu$ and preferably between 40 and $60\mu$.

To obtain a perfect smoothing of the layer of pulverulent dressing, a varnish is used which contains a surface-active agent. By way of example, varnishes may be used of the modified or non-modified phenol type, or of the glycerophthalic type. It is important to note that, after the smoothing operation, although the micro-fissures 18 have been eliminated, the large-amplitude and shallow-depth undulations remain entirely. After application of the layer of varnish 20, the surface is advantageously subjected to a heat treatment. After this heat treatment, the layer of varnish 20 applied to the layer 12 of pulverulent dressing has a thickness of the order of 20μ. The sheet metal thus prepared is finally subjected to a metallization operation, for example aliminizing. The coating of aluminium may be obtained in conventional manner by various methods, particularly by the so-called evaporation in vacuo method. To carry out this technique, the surface to be coated is passed into a chamber in which a high vacuum prevails, about $10^{-4}$ to $10^{-5}$ Torr, and in which metallic vapours are present, for example emitted from a crucible containing the metal which is to constitute the coating (e.g. aluminium), which is taken to a high temperature, generally higher than the melting temperature of the metal. The vapours condense on the surface to be coated and form a perfectly adherent coating whose thickness may, according to the conditions, vary from between a few tenths and a few tens of microns.

According to a variant embodiment of the process according to the invention, the layer 12 of pulverulent dressing is not applied to the unpolished metallic surface, but to a surface having undergone a prior phosphatization. This variant further improves the anti-corrosive properties of the surface thus coated.

The present invention also relates to the application of the process described hereinabove to the production of reflectors for headlights of automobile vehicles.

According to the invention, the reflectors for vehicle headlights are characterised in that the stamped, unpolished sheet metal 10 is provided with a coating constituted by a thermally fixed layer 12 of pulverulent dressing, a layer of varnish 20 and a film of aluminium, the reflecting surface of said reflector presenting ondulations 16 of large amplitude and shallow depth, constituted by a plurality of troughs and crests having an average diameter of the order of 1 to 2 mm, the depth of said ondulations being of the order of 0.05 to 0.10 mm.

In the particular case of the process described hereinabove being applied to the production of reflectors of vehicle headlights, a certain number of other determining advantages is obtained. A considerable reduction in the cost of the surface thus coated is firstly to be noted, since the conventional polishing operations are eliminated, said operations being particularly difficult to effect in the case of reflectors whose frontal aperture is not circular.

The glass of vehicle headlights generally comprises a certain number of grooves, intended to efface the edges of too clear images of the lamp filaments. The reflecting surface according to the invention therefore comprises a plurality of undulations 16 giving the surface thus coated the general appearance of an "orange skin". These undulations in fact enable the edges of too clear images of the lamp filaments to be dispersed by deviation. This therefore reduces the number of grooves on the front glass of the headlight and therefore enables the cost price of the headlights to be further reduced.

It should also be noted that the presence of these large-amplitude and shallow-depth undulations 16 does not cause any notable loss of illumination at the centre of the reflected light beam. On the other hand, at the edge of this beam, there is no adverse influence beyond 0.2°, this being perfectly acceptable and not affecting the qualities of the beam, for a beam of an aperture greater than 1°. In other words, due to the ratio between the diameter and depth of the undulations 16, the diffusion given by the reflector is substantially of the order of 0.1° to 0.2°, this being perfectly acceptable for producing a reflector for vehicle headlights. Finally, it will be noted that a reflector thus coated has excellent anti-corrosive properties; a perfect resistance in a salty mist medium for a duration longer than 300 hours was noted.

On the other hand, the layer of varnish 20, applied to the layer 12 of pulverulent dressing having undergone a heat treatment considerably increases the heat stability of said dressing 12. This is particularly important in the case of the surface being near a lamp filament taken to a high temperature as well as in the particular case of an automobile vehicle headlight for which the front glass will be hot-glued on the open edge of the reflector.

EMBODIMENT OF THE PROCESS ACCORDING TO THE PRESENT INVENTION

There is applied to the stamped reflector a layer of a pulverulent dressing, constituted for example by a coating of epoxy type, such as the epoxy powder manufactured by Belgian Company Liber under the designation transparent Oxyplast F 1000/13C. This application is effected for example by electrostatic spraying. The surface thus coated is then subjected to a drying operation for 10 minutes at a temperature of about 180° C. Once the epoxy coating layer is fixed to the metal sheet smoothing is effected by the deposit of a layer of varnish; for example, a glyceromelamine varnish may be used as manufactured by British Company International Pinchin Johnson under reference O 301 C 8404, or a modified phenol varnish such as the one manufactured and marketed by French Company Corona under reference PZ 1232. The deposit of varnish may for example be effected by soaking, followed by draining for 4 minutes. The surface thus treated is then subjected to baking for a duration of the order of 7 minutes at a temperature of the order of 250° C. The aluminizing of the surface, which may or may not be followed by protective treatments, terminates the mirror. This aluminizing may advantageously be obtained by evaporation in vacuo.

What is claimed is:

1. A reflector for automobile headlights, comprising a stamped unpolished sheet of metal;
   - a coating thereon including a layer of a thermally fixed pulverulent dressing;
   - a layer of varnish upon said coating;
   - and a film of aluminium adhered to the layer of varnish;
   - the reflecting surface of said reflector having large-amplitude and shallow-depth undulations.

2. A reflector according to claim 1, said undulations being constituted by a plurality of troughs and crests having an average diameter of the order of 1 to 2 mm, the depth of said undulations being in the order of 0.05 to 0.10 mm.

3. A reflector for automobile headlights, comprising a stamped unpolished sheet of metal;
   - a coating thereon including a layer of thermically fixed pulverulent dressing;
   - a film of aluminium overlying said dressing;
   - and a layer of varnish interposed between said dressing and film of aluminium.

4. A reflector according to claim 3, wherein the pulverulent dressing is chosen from resins of the epoxy, polyurethane, polyester, polyvinyl and acrylic type.

5. A reflector according to one of claims 3 and 4, wherein the layer of pulverulent dressing is heat treated and after its heat treatment, is between about $30\mu$ and $80\mu$ in thickness.

6. A reflector according to one of claims 3 and 4, wherein the layer of pulverulent dressing is heat treated and after its heat treatment, is between about $40\mu$ and $60\mu$ in thickness.

7. A reflector according to one of claims 3, 4, wherein the varnish is chosen from varnishes of modified or non-modified phenol type or of gylcerophtalic type.

8. A reflector according to claim 7, wherein the varnish contains a surface active or surfactant agent.

9. A reflector according to one of claims 3 and 4, wherein the layer of varnish has a thickness of the order of $20\mu$.

10. A reflector according to one of claims 3, 4, 8, wherein the reflecting surface of said reflector has large-amplitude and shallow-depth undulations.

11. A reflector according to claim 10, wherein said large-amplitude and shallow-depth undulations are constituted by a plurality of troughs and crests having an average diameter, of the order of 1 to 2 mm;

the depth of said undulations being of the order of 0.05 to 0.10 mm.

* * * * *